United States Patent [19]

Cumpston, Jr.

BEST AVAILABLE COPY

[11] E Re. 29,053

[45] Reissued Nov. 30, 1976

[54] MIXER-REFINER

[76] Inventor: Edward H. Cumpston, Jr., 43 Monument Ave., Old Bennington, Vt. 05201

[22] Filed: Mar. 8, 1976

[21] Appl. No.: 664,657

Related U.S. Patent Documents

Reissue of:

[64] Patent No.: 3,806,050
Issued: Apr. 23, 1974
Appl. No.: 251,779
Filed: May 9, 1972

U.S. Applications:

[63] Continuation-in-part of Ser. No. 142,501, May 12, 1971, abandoned.

[52] U.S. Cl. ..... 241/260; 241/298

[51] Int. Cl.[2] ..... B02C 7/12

[58] Field of Search ..... 241/260, 261, 261.1, 241/261.2, 261.3, 294, 298, 299, 300

[56] References Cited

UNITED STATES PATENTS

| | | | |
|---|---|---|---|
| 1,593,153 | 7/1926 | Ambler | 241/298 X |
| 2,968,444 | 1/1961 | Jones | 241/260 X |
| 2,970,783 | 2/1961 | Cheyette | 214/300 |
| 2,978,192 | 4/1961 | Cumpston | 241/260 X |
| 3,221,999 | 12/1965 | Cumpston | 241/260 X |
| 3,323,733 | 6/1967 | Brown | 241/260 X |
| 3,326,480 | 6/1967 | Jones | 241/300 X |

*Primary Examiner*—Granville Y. Custer, Jr.
*Assistant Examiner*—Howard N. Goldberg
*Attorney, Agent, or Firm*—Stonebraker, Shepard & Stephens

[57] ABSTRACT

A high viscosity material mixer-refiner having a cylindrical stator shell and rotor has improved refining surfaces on the rotor and stator. These are formed of interchangeable blocks held in place on the rotor and the stator with the blocks having teeth oriented in different aspects to the relative motion between the rotor and the stator. The teeth are preferably raised bars with orientations for advancing or retarding material. The blocks are arranged in desired patterns to accomplish optimum mixing and refining.

35 Claims, 27 Drawing Figures

INVENTOR.
EDWARD H. CUMPSTON JR.
BY Cumpston, Shaw and Stephens

INVENTOR.
EDWARD H. CUMPSTON JR.
BY Cumpston, Shaw and Stephens
ATTORNEYS

INVENTOR.
EDWARD H. CUMPSTON JR.
BY Cumpston, Shaw and Stephens
ATTORNEYS

MIXER-REFINER

Matter enclosed in heavy brackets [ ] appears in the original patent but forms no part of this reissue specification; matter printed in italics indicates the additions made by reissue.

RELATED APPLICATIONS

This application is a continuation-in-part of my parent application, Ser. No. 142,501, filed May 12, 1971, entitled Improved Refiner, and abandoned upon the filing of this application.

BACKGROUND OF THE INVENTION

Highly viscous materials bordering between solids and fluids present special problems in mixing, refining and reacting. These materials cannot be reliably pumped, and do not follow the laws of fluids or solids flow. These materials tend to pack into any available constrained space, and tend to separate liquid from solid to form a hard solid mass if subjected to high pressure. Hence, it has been difficult to mix or refine high viscosity material reliably in a controlled way. These problems have been dealt with in my previous U.S. Pat. Nos. 2,722,163, 2,824,500, 2,978,192 and 3,221,999.

The invention involves recognition of the importance of controlling the flow of highly viscous material for mixing or refining, and devising of a simple and efficient way of controlling and varying the flow of such material as it passes through a refiner. The invention includes improved refining surfaces for a generally known cylindrical mixer-refiner having an internal rotor and a stator shell, and the improved refining surfaces are developed for optimum control of the movement and mixing of the material as it passes through the refiner to avoid packing, solid-liquid separation, and to ensure optimum and even mixing and refining.

SUMMARY OF THE INVENTION

The invention provides improved refining surfaces for a high-viscosity material mixer-refiner having an internal rotor and a stator shell forming a cylindrical refining region. The refining surfaces are formed for a plurality of stator and rotor blocks having teeth and removably and interchangeably held in place respectively on the stator and rotor. The teeth are preferably raised bars with inclined leading edges, and the set of blocks for both the rotor and the stator includes blocks having teeth oriented in different aspects to the relative motion between the rotor and stator, preferably for advancing material and retarding material. By arranging the blocks as desired, preferably in grooves spaced around the stator and rotor, regions for feeding and holding can be established as desired along the length of the refiner and around its circumference to process the material as desired. Hundreds of patterns can be used to adapt a refiner for optimum processing of any viscous material since the severity of the processing treatment of a material flowing through the refiner is dependent on how much of the material is layered between the shell and rotor surfaces, and this material build-up is controlled by the flow pattern arrangement of the blocks mounted on the rotor and stator.

THE INVENTIVE IMPROVEMENT

Both dry solid materials and relatively low viscosity fluid materials are fairly easy to mix and process in conventional equipment, but the poor flowability of highly viscous materials produces uneven and unreliable processing even where such materials can be passed through conventional equipment. A material presenting such problems is high-viscosity paper-pulp material containing cellulose fibers and relatively little moisture. In a less viscous state, such material is quite flowable and readily controlled, but cannot be refined readily because the liquid protects the fibers. In a highly viscous state, such material can be refined to produce stronger papers and other advantages, except that controlling the flow and uniform mixing and refinement of the material has been unsatisfactory. The shear forces that occur when such high viscosity material is forced between refining surfaces is sufficient to accomplish the desired refining if the mixing is thorough and even, if the flow is accurately controlled, and if the material is kept from packing up or speeding through the refiner.

Causing the material to flow through a disk refiner is relatively easy. For example, almost any material can be made to flow through a disk mill because of the high centrifugal forces and the open discharge. Controlling the flow in a disk mill is extremely difficult, however, because any method of retaining material by resisting the centrifugal forces is subject to immediate plugging by these highly viscous and "non-flowing" materials. This is particularly true of thick, fibrous suspensions which, under pressure, can thicken into a solid mass.

The inventive mixer-refiner avoids the problem of trying to restrain centrifugal force by forming a cylindrical refining region with material moving parallel to the axis of the machine. Processing occurs between the working surfaces of an internal rotor and a stator shell defining a cylindrical refining region. The confronting surfaces of the rotor and stator have working teeth that both mix and refine the material and control its flow through the machine, and these teeth are on interchangeable blocks preferably mounted in longitudinal, dovetailed grooves. The circumferential surfaces between the grooves is generally cylindrical and flush with the bottom of the exposed teeth which are preferably formed as raised working bars with inclined leading edges. The result is a rotating inner surface and a stationary outer surface which are generally smooth and cylindrical except for the raised bars provided by the blocks. These bars are spaced apart between adjacent, axial blocks, and radially spaced across the grooves to afford smooth regions for turbulent flow of material between sets of working bars. The blocks can be interchanged longitudinally in a groove or circumferentially from one groove to another to accomplish many different patterns.

Each block is independent of all other blocks, and the sets of blocks for both the rotor and stator preferably include teeth oriented in different aspects to the relative motion between the rotor and the stator. These orientation aspects preferably include bars angled to feed or advance material toward the outlet and bars angled to retard or move material toward the inlet to hold material between the stator and rotor surfaces to produce a more densely packed layer resulting in increased refining action on the material. Also, neutral bars that neither advance nor retard material but mix, shear, and refine the material as they move relative to the material can be added.

With these three teeth orientations of blocks, and with block interchangeability, flow of a material can be promoted and controlled to suit the material being processed. For example, if a material tends to pack too tightly between the refining surfaces to consume too much power and cause excessive refining, then rearranging the blocks or substituting additional feed or advancing blocks will increase the flow, reduce the retention of material, and cause the desired refining action. In general, if more feed blocks are used on the stator surface and more hold blocks on the rotor surface, the refiner will tend to be self stabilizing over a fairly wide range of operating conditions. It has been found, however, that when changing from one kind of material to another an entirely different arrangement of blocks may be required. Also, flow control in the inventive mixer-refiner is described more fully below.

These are two basic approaches to arranging feed and hold blocks to achieve the desired flow pattern. Feed and hold blocks may be alternated by longitudinal rows or may be alternated in circular rings, and these two approaches can be intermixed in many ways. The inter-action between the shell and rotor hold and feed blocks adds even more flexibility. This is discussed more fully below.

It is preferred for successful operation of the mixer-refiner that material being processed be kept constantly moving to prevent packing which might interfere with throughput flow. To ensure this constant motion and mixing action, the refining blocks are designed to produce constant circumferential circulation of material. The raised working bars are never angled so steeply from the path of relative motion that the slippage through the material is prevented. The leading edges of the bars are inclined, and the bars are spaced apart and their sides slanted so they will not pack material. The bars are smooth surfaced, and generally smooth cylindrical surfaces are provided between axial rows of blocks on both the shell and rotor surfaces to allow material to slide and mix between each row of blocks. Material is tumbled, sheared, and mechanically thrown either toward the machine outlet or inlet to accomplish mixing and refining without creating fluid pressure which tends to separate solids from liquids.

DRAWINGS

Figure 16:
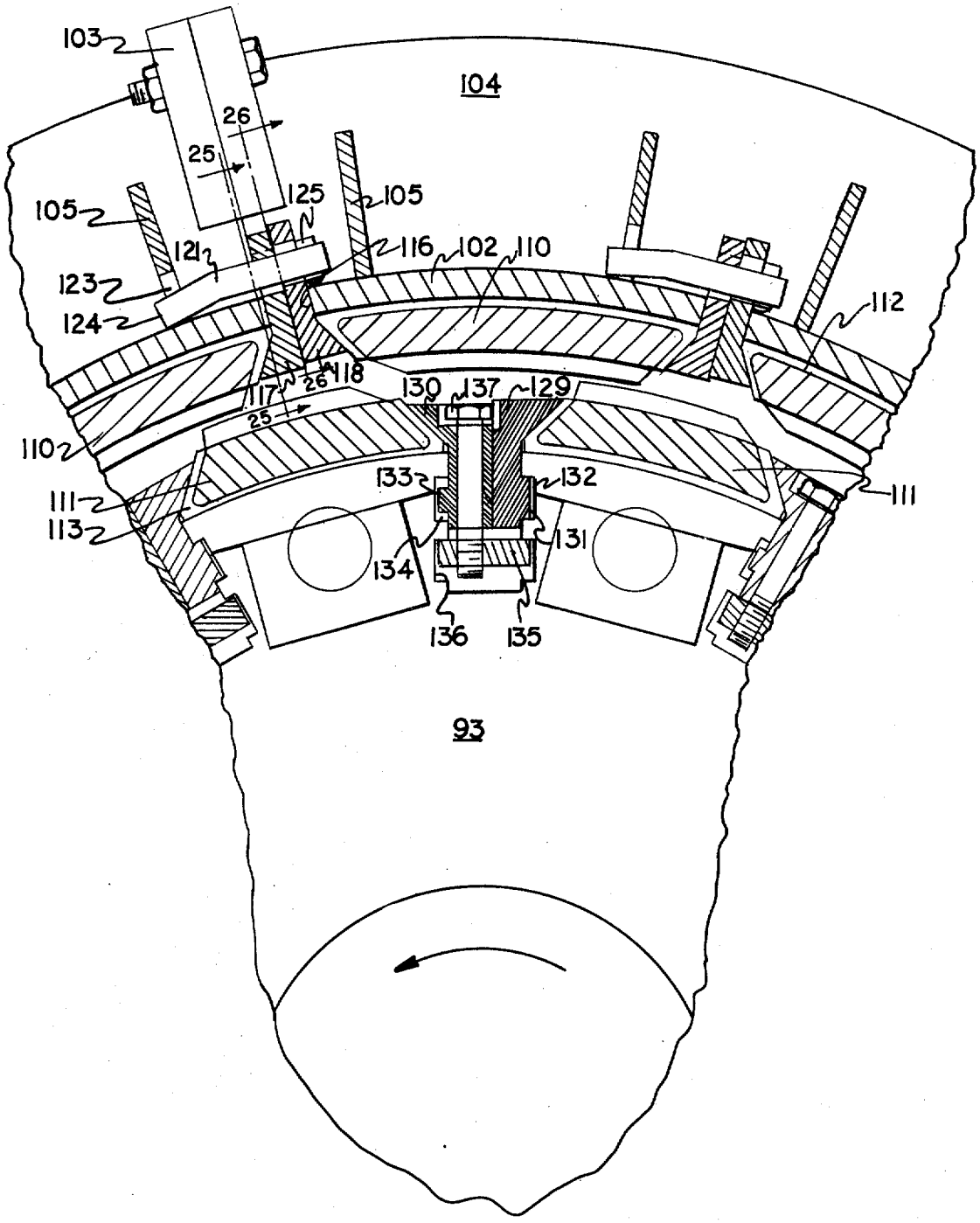
FIG. 16 is a fragmentary, transverse, cross-sectional view of the mixer-refiner of FIG. 15, taken along the lines 16 — 16 thereof.
Figure 17:
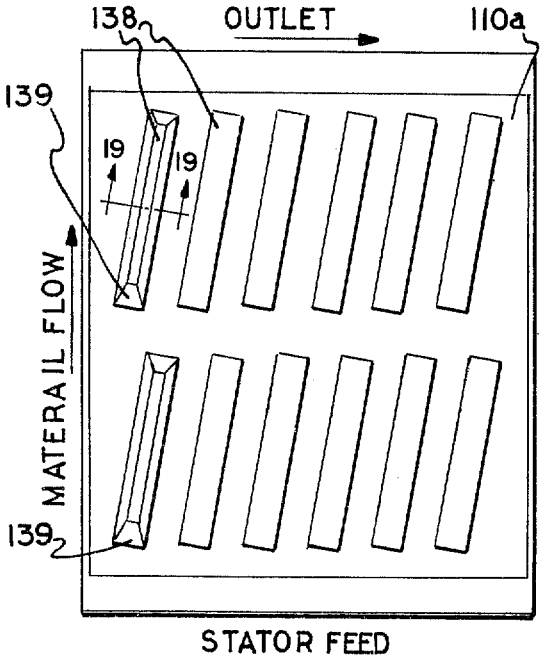
FIGS. 17 and 18 are plan views of stator blocks preferred for the mixer-refiner of FIG. 15.
Figure 21:
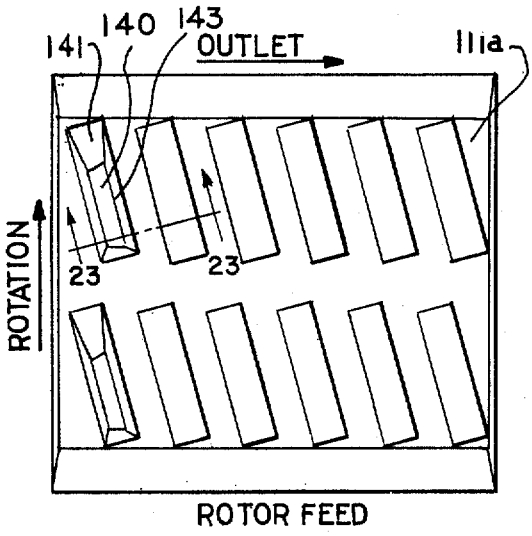
FIGS. 21 and 22 are plan views of rotor blocks preferred for the mixer-refiner of FIG. 15.
Figure 22:
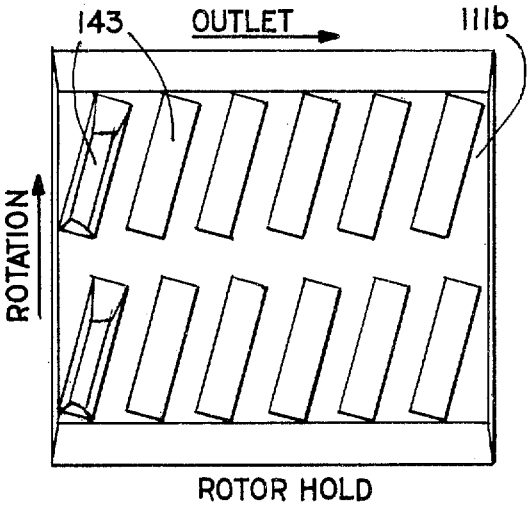
Figure 24:
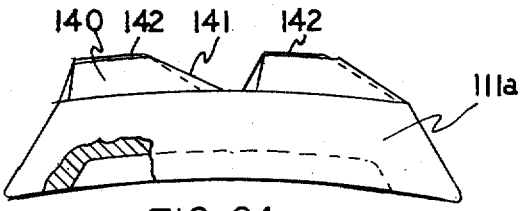
Figure 25:
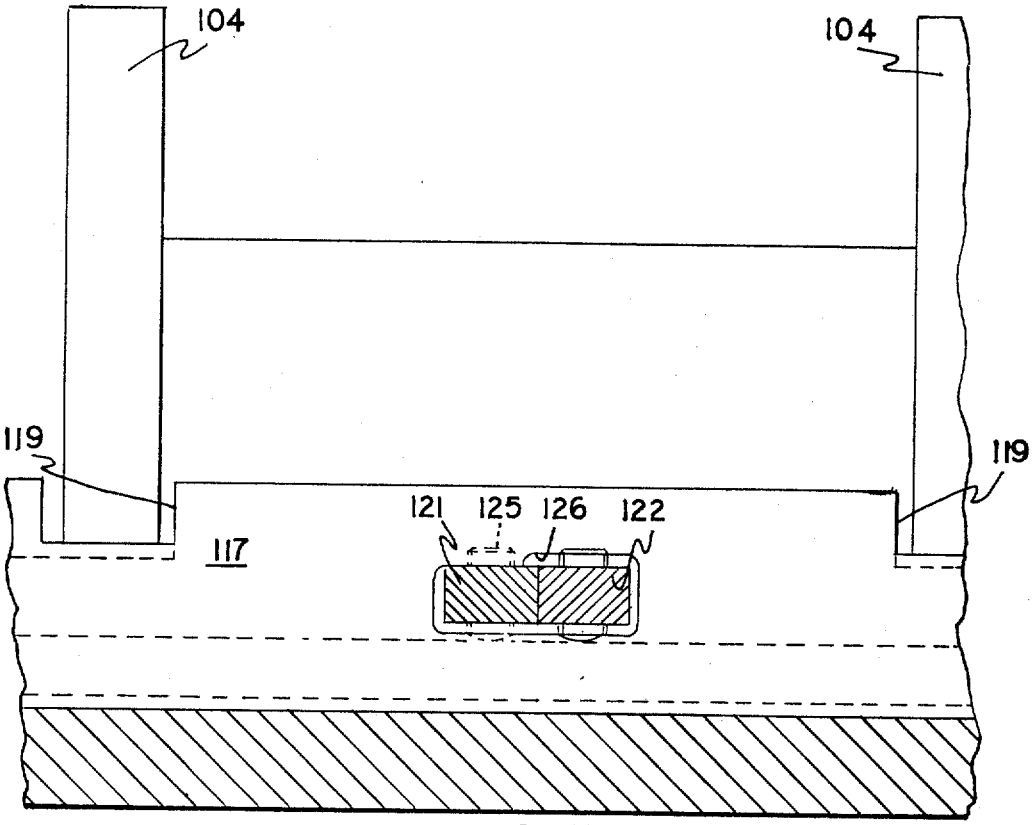
Figure 26:
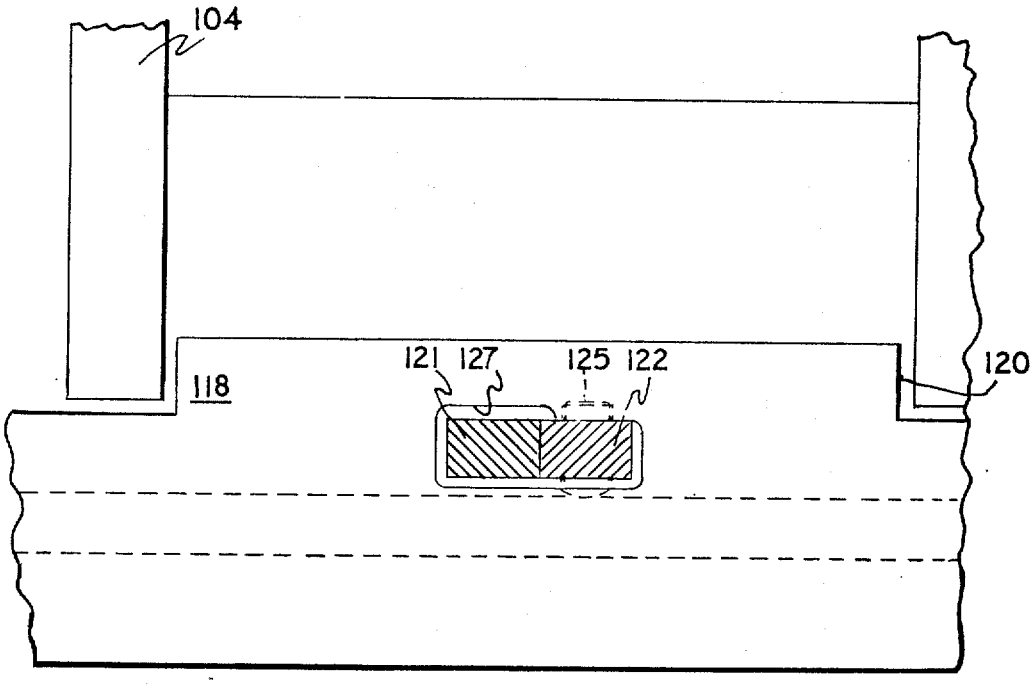

FIG. 24 is an end elevation of the rotor blocks of FIGS. 21 and 22; and FIGS. 25 and 26 are fragmentary, cross-sectional views of the stator bar clamping arrangement, taken respectively along the lines 25 — 25 and 26 — 26 of FIG. 16.

DETAILED DESCRIPTION

Figure 1:
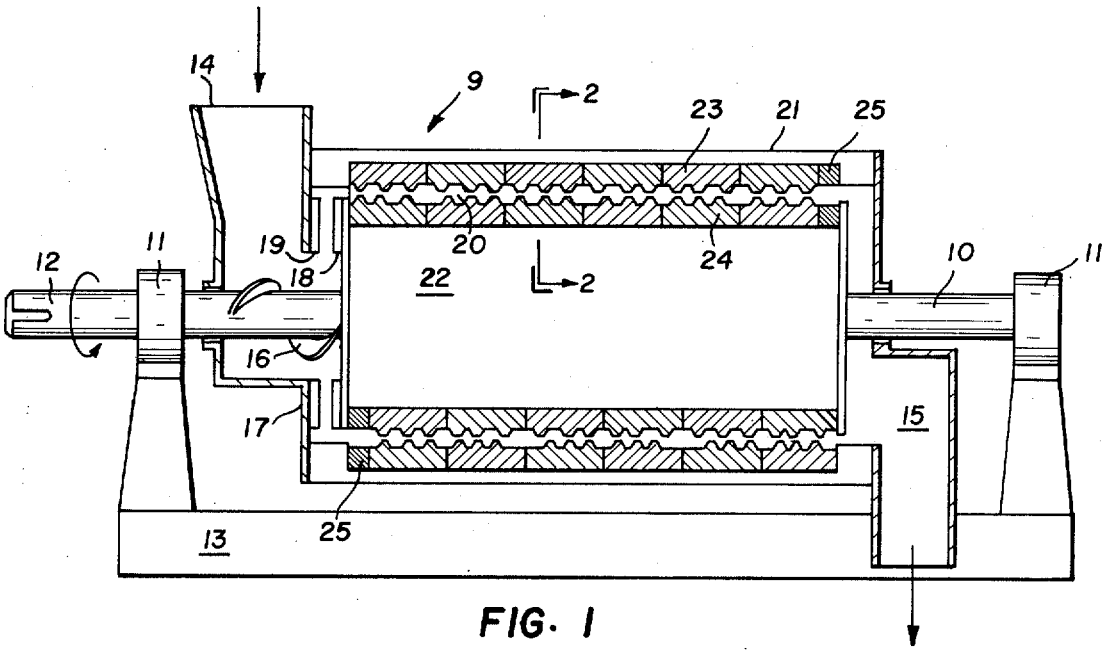
FIG. 1 is a partially schematic, axial cross section view of a preferred embodiment of the inventive machine.

The preferred embodiment of the inventive mixer-refiner 9 as illustrated in FIG. 1 includes a shaft 10, bearings 11 and a motor drive (not shown) for turning the driven end 12 of shaft 10 as shown by the arrow. Refiner 9 also includes a base 13, a hopper inlet 14, an open gravity discharge chute 15, a combination lump breaker and feed screw 16 for forcing material from hopper 14 into the refiner and a disk mill type material feeder 17 having rotating bars 18 that confront stationary bars 19 across a narrow gap. The disk feeder 17 takes material away from screw 16, ensures that it is broken down to a size suitable for refining, and by centrifugal force drives the material into refiner 9. A cylindrical refining region 20 is formed between stator shell 21 and rotor 22 mounted on shaft 10 for rotation inside shell 21. Refining region 20 extends axially for the length of shell 21 and rotor 22 to refine the materials fed from disk mill 17 and discharge the refined material through chute 15. The improvement in refiner 9 involves the formation of the refining surfaces along region 20. The details of this are shown more fully in FIGS. 2 – 12.

Figure 2:
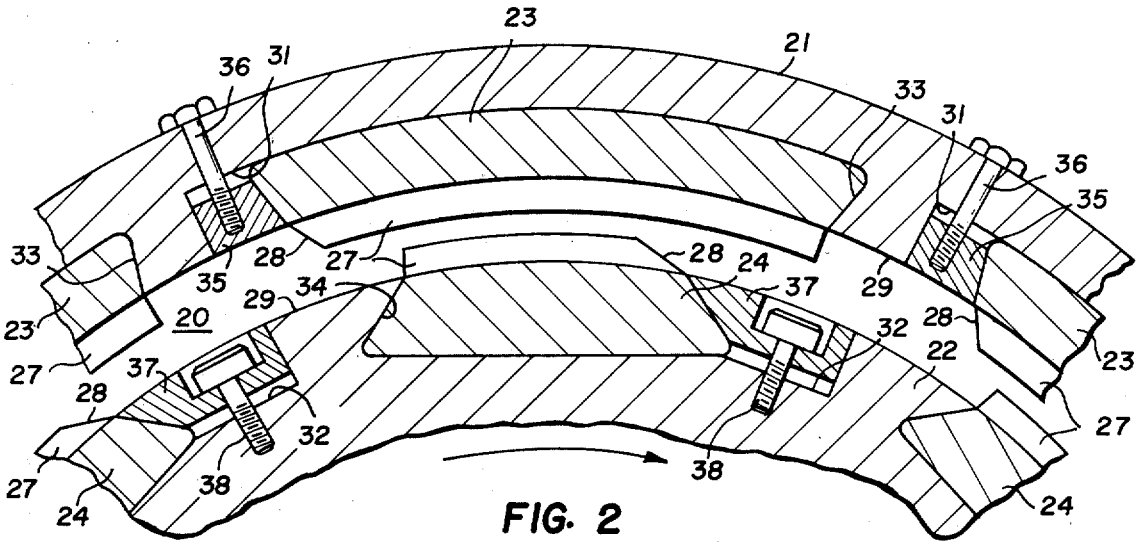
FIG. 2 is an enlarged, fragmentary cross-section of the machine of FIG. 1 taken along the line 2 — 2 thereof.

As best shown in FIG. 2, grooves 31 extend axially the length of shell 21, and grooves 32 extend axially the length of rotor 22. The edge of groove 31 that trails relative to material motion is formed as a dovetail 33, and the edge of groove 32 that trails relative to rotation of rotor 22 has a dovetail 34. Stator blocks 23 are bedded in grooves 31 with their trailing edges resting in dovetail 33, and rotor blocks 24 are bedded in grooves 32 with their trailing edges resting in dovetail 34. Stator blocks 23 and rotor blocks 24 preferably have the same axial dimension, although stator blocks 23 have a somewhat greater circumferential dimension. Grooves 31 and 32 are filled with respective blocks 23 and 24 with such blocks in axial abutment. To avoid having an unswept circular path of material, the refiner 9 is made a whole number of blocks long plus about 1 inch extra for blank spacers 25 shaped to fit in grooves 31 and 32.

Figure 11:
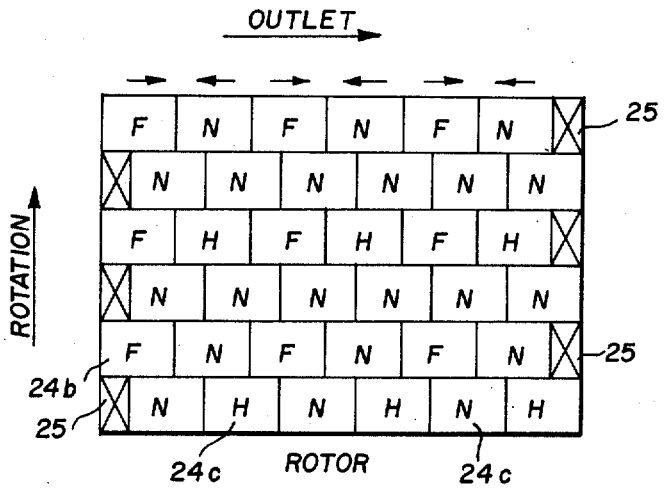
FIGS. 11 and 12 are schematic, plan views of one of many preferred block arrangements for a rotor and shell laid out flat.
Figure 12:
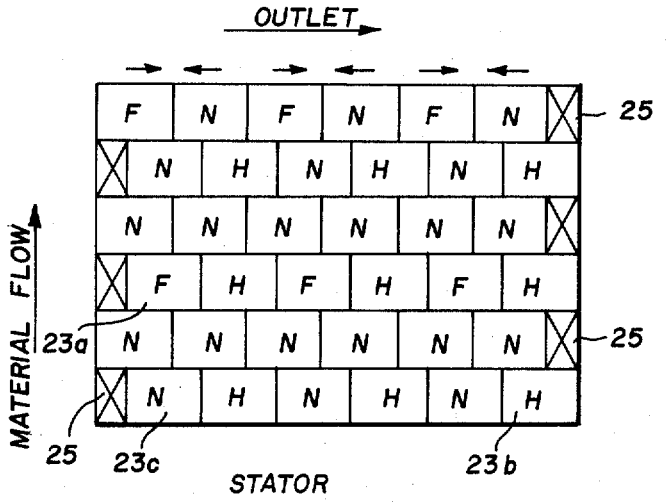

By alternating spacers 25, the junctions between adjacent blocks in rows of blocks on stator 21 and rotor 22 are staggered to offset the refining blocks and eliminate any unswept area. This is also shown in FIGS. 11 and 12.

Figure 2A:
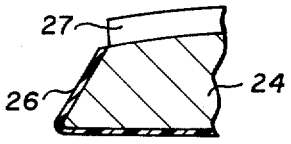
FIG. 2A is an enlarged, fragmentary cross section of a rotor block from FIG. 2.
Figure 3:
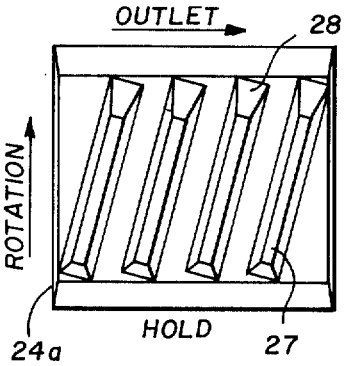
FIGS. 3 – 8 are plan views of preferred embodiments of stator and rotor blocks.

Blocks 23 and spacers 25 are secured in place by dovetail shaped clamp bars 35 that are drawn into groove 31 by screws 36 through stator 21. Similar dovetailed clamp bars 37 are drawn into grooves 32 by screws 38 to hold blocks 24 and spacers 25 in place in rotor 22. Any desired arrangement of blocks 23 and 24 can be made by removing clamp bars 35 or 37 and arranging interchangeable blocks as desired. Each of the blocks 23 and 24 is preferably cast of a hard metallic alloy and has its dovetailed shape base cast or potted in an epoxy or other plastic grout 26 as shown in FIG. 2A to produce the precise shape to fit dove-tailed slots 31 and 32.

Blocks 23 and 24 clear each other by about one-quarter inch when the blocks are new, and they are preferably replaced when their clearance wears to about five-eighths inches. The refiner shown in the drawing is a pilot-sized machine having six axial grooves 31 and 32 in stator 21 and rotor 22 for holding six rows of blocks with each row being six blocks long for a total of 36 blocks in the refining surfaces of stator 21 and rotor 22. The inside surface of stator 21 is preferably smooth and flush with the base portion of blocks 23, and the outer surface of rotor 22 is also generally smooth and flush with the base portion of blocks 24. The spaces between rows of blocks 23 and 24 allow material to collect and move to flow smoothly from one working surface to the next without plugging or packing. Also, the working surfaces of each of the blocks 23 and 24 leave some space along the axial edges of such blocks to prevent plugging or packing.

The working surfaces of blocks 23 and 24 preferably comprise teeth formed as bars 27 raised above the base portion of the blocks as schematically illustrated in FIG. 2. Bars 27 are generally smooth with sloping sides and extend about one-half inch beyond the base of the blocks to clear each other by about one-quarter inch. The leading ends 28 of working bars 27 are beveled back at about 60° to a radial line to prevent hang-up of material on leading edges 28. Blocks 23 and 24 are securely supported by dovetails 33 and 34 at their trailing ends, and clamp bars 35 and 37 secure leading ends tightly into grooves 31 and 32. Preferred details for the working surfaces for blocks 23 and 24 are better shown in FIGS. 3 – 10 which illustrate block castings lacking the plastic grout 26 shown in FIG. 2A.

Figure 4:
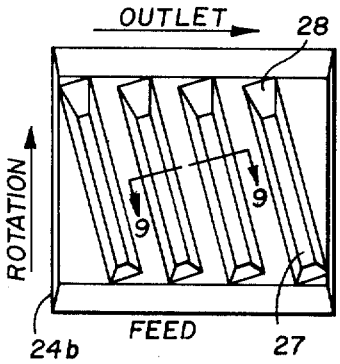
Figure 5:
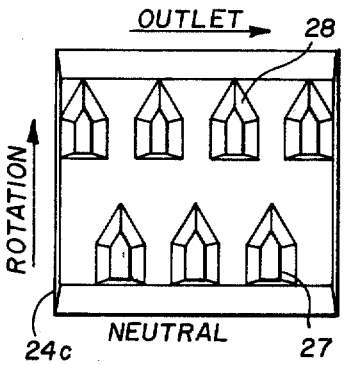
Figure 9:
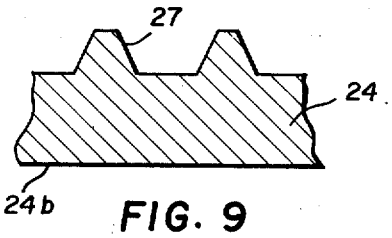
FIGS. 9 and 10 are enlarged, fragmentary, cross-sectional views of the blocks of FIGS. 4 and 7 respectively as indicated.
Figure 10:
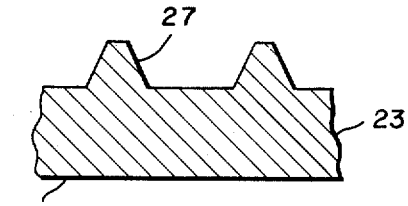

Three preferred forms of rotor blocks 24 are shown in FIGS. 3 – 5 and 9. Block 24b of FIG. 4 has its teeth 27 inclined by preferably about 15° from the rotation direction of the rotor for feeding material toward the outlet of the refiner as indicated by the arrow. The preferred cross-sectional shape of working bars 27 is shown in FIG. 9, and the same shape is used for tooth bars 27 on block 24a of FIG. 3 where bars 27 are inclined by about 15° from the direction of rotation to hold back or retard material and force it back toward the inlet of the machine. A neutral, refining block 24c is shown in FIG. 5 with its working teeth 27 following the direction of rotation so as not to feed or retard material. Teeth 27 of block 24c pass through, shear, and mix the material being refined, and tend to carry such material circumferentially, but neither advance nor retard it.

Three preferred orientations of stator blocks 23 are shown in FIGS. 6 – 8 and 10. Block 23b of FIG. 7 has its teeth 27 inclined as illustrated so that material tending to move in the direction of the arrow is directed away from the outlet of the machine and toward the inlet for holding back or retarding the material. Teeth 27 on block 23 are preferaly angled about 10° from the direction of material motion, and are spaced further apart than the bars 27 on rotor blocks 24. This is to ensure that material slips or moves along in the stator in spite of the effect of centrifugal force which tends to pack the stator and keep the rotor clear. The smaller inclination and wider spacing of teeth 27 on block 23b prevents plugging or packing of material into the stator.

Figure 6:
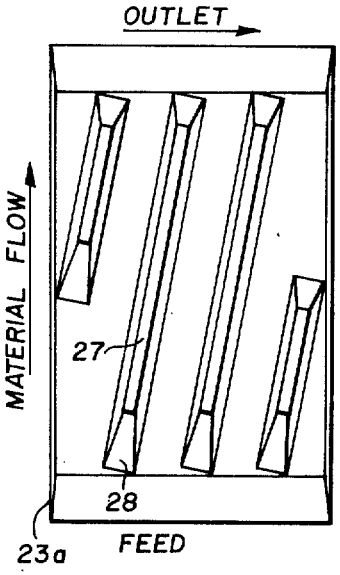
Figure 7:
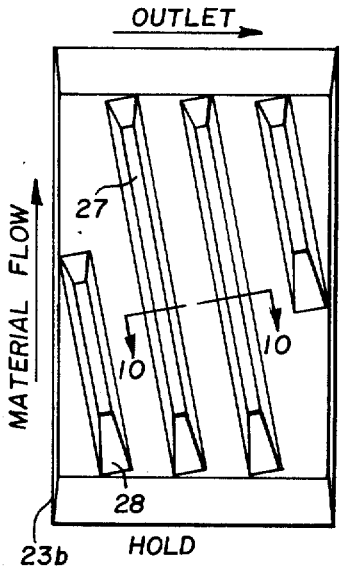
Figure 8:
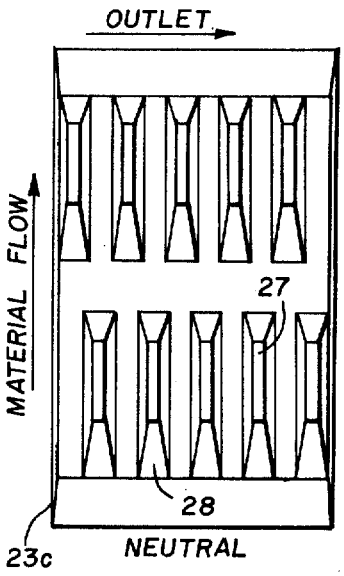

Teeth 27 of block 23a of FIG. 6 are the same as the teeth on block 23b except they are angled by approximately 10° from the material flow direction to feed material along toward the outlet of the refiner. Teeth 27 on neutral block 23c follow the line of material motion, and refine material without feeding or holding back.

FIGS. 11 and 12 schematically show one of many preferred arrangements for rotor blocks 24a, b, and c, and stator blocks 23a, b, and c. Each of these blocks is marked "F" for feeding "H" for holding back, and "N" for neutral refining, and the blocks are shown as laid flat. Generally, the flow control blocks for feeding and holding back are preferably spaced both longitudinally and circumferentially. The arrows represent alternating feed and hold rings which oppose each other tending to trap material between them and thus ensure a full layer of material in the cylindrical refining zone. The use of blank spacers 25 is shown for staggering rows of blocks.

Since the original application was filed an experimental model of the inventive mixer-refiner was built and tested. This led to some improvements in the invention and to a better understanding of its operation. From this work, two preferred embodiments of the inventive mixer-refiner have emerged, and these are described below, along with some of the improvements. Also, the operation of the equipment is explained more fully.

Figure 13:
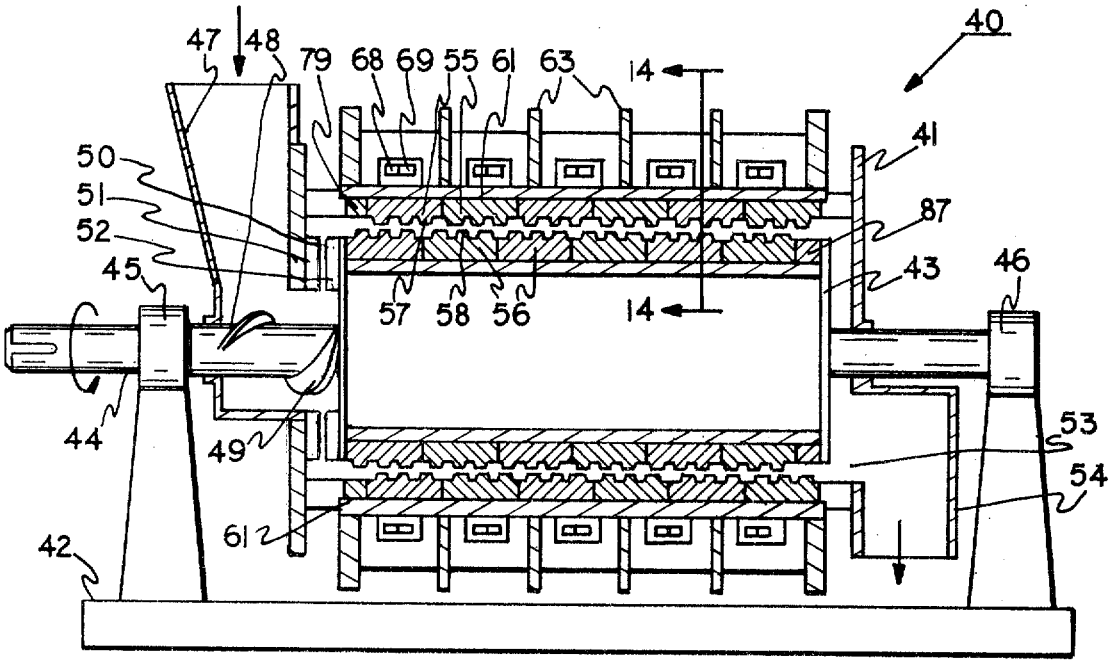
FIG. 13 is a longitudinal, cross-sectional view of an alternative, preferred embodiment of the inventive mixer-refiner.
Figure 14:
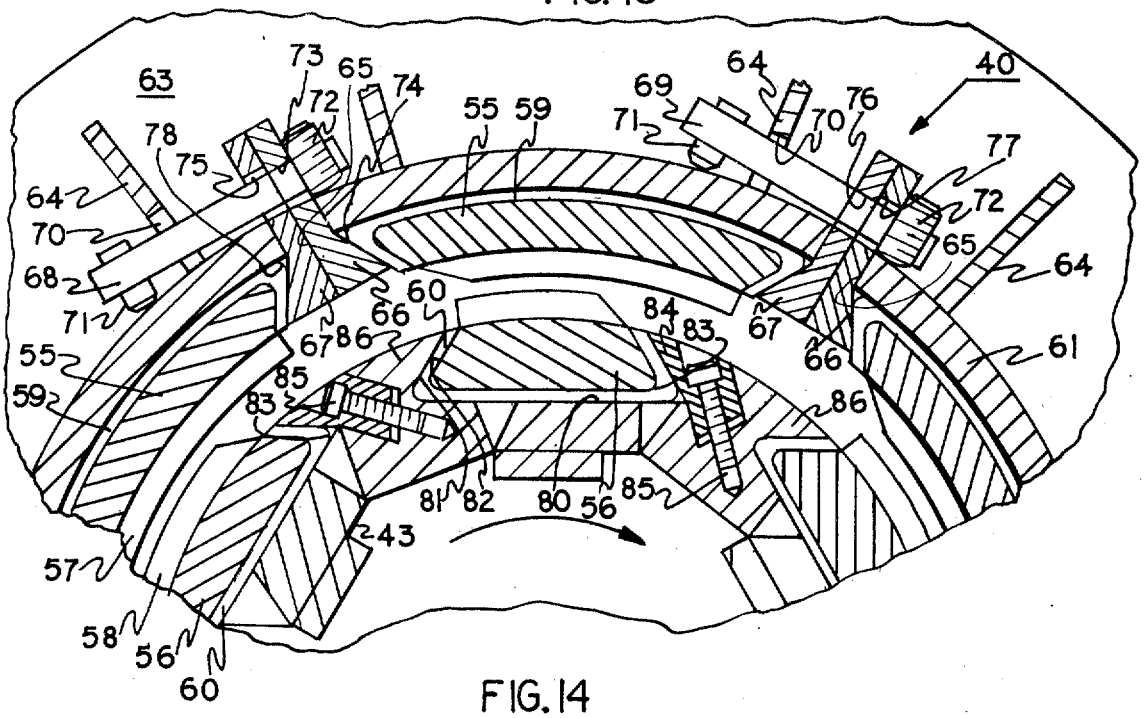
FIG. 14 is a fragmentary transverse, cross-sectional view of the mixer-refiner of FIG. 13, taken along the line 14 — 14 thereof.
Figure 15:
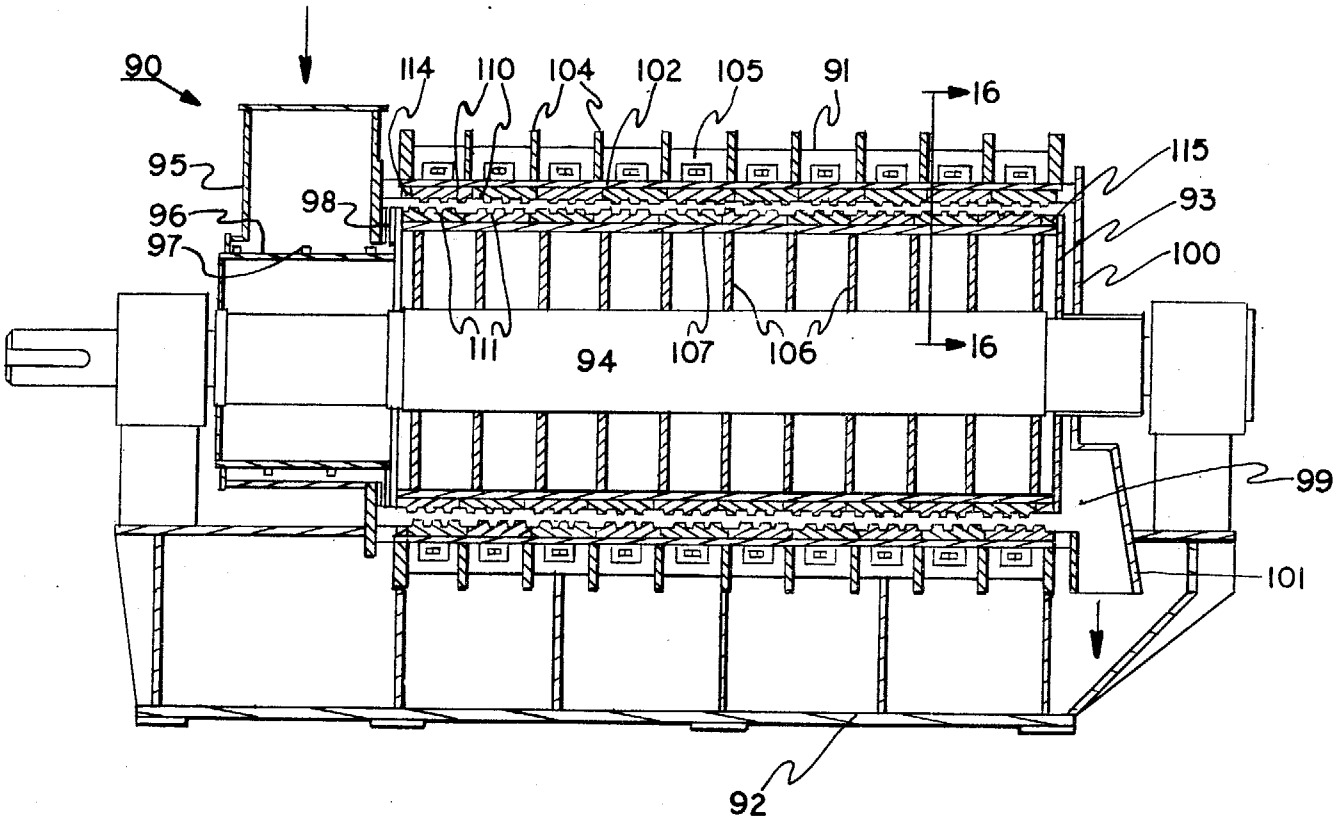
FIG. 15 is a longitudinal, cross-sectional view of another preferred embodiment of the inventive mixer-refiner.

A relatively small mixer-refiner 40 is shown in FIGS. 13 and 14. It includes a fixed cylindrical stator 41 supported on a base 42 and a coaxial, internal rotor 43 supported on shaft 44. Bearings 45 and 46 support shaft 44 for being driven by a motor (not shown) for turning rotor 43 inside of stator 41.

Material for mixing and refining is input to machine 40 through chute 47 where it is fed axially of sleeve 48 by screw 49. A disk refiner 50 at the input region of machine 40 has stator bars 51 and confronting rotor bars 52 for breaking up the input material into relatively small bits for mixing and refining in machine 40. The mixed and refined material passes through an outlet opening 53 and is discharged out of chute 54.

Stator 41 and rotor 43 respectively carry interchangeable blocks 55 and 56 having respective raised bars 57 and 58 for mixing and refining material along the length of machine 40. Stator blocks 55 are similar to blocks 23A and B of FIGS. 6 and 7 and rotor blocks 56 are similar to blocks 24A and B of FIGS. 3 and 4. Blocks 55 and 56 are preferably cast of a relatively hard metal and preferably have their bases potted in epoxy to form epoxy coatings 59 and 60. Preferably the epoxy coating is formed in a single mold for all stator blocks 55, and is another mold for all rotor blocks 56, so that epoxy coatings 59 and 60 are accurately uniform for all blocks 55 and 56. Then blocks 55 and 56 can be accurately mounted in place with improved clamping bars as best shown in FIG. 4 and described below.

Stator 41 is preferably formed of a pair of semi cylindrical shells 61 having flanges 62 that are bolted together. Several radial annuli 63 surround and strengthen shells 61, and axial bars 64 extend longitudinally of shells 61 and pass through radial annuli 63. The result is a sturdy and rugged stator 41.

Stator blocks 55 are held in place on the inside of shells 61 by clamp bars as described below. Axial slots 65 are formed through shells 61 and radial plates 63 to extend the length of stator 41. A clamp bar 66 and a wedge bar 67 extend through each of the slots 65 and are respectively held in place by screw levers 68 and 69. Clamp bars 66 and wedge bars 67 have dovetail shaped heads inside shells 62 and flat bodies that extend through slots 65 and are notched along their length to fit into notched relationship with annular plates 63.

Bars 66 and 67 are held against radial movement by screw levers 68 and 69 that extend through bars 66 and 67 and through holes 70 in axial bars 64. Each of the screw levers 68 and 69 has a fulcrum pin 71 resting against shell 61 and a screw 72 turned against shell 61 to draw screw lever 68 or 69 away from the shell 61. Screw levers 68 pass through and engage holes 73 in clamp bars 66 to draw bars 66 tightly against the leading ends 74 of stator blocks 55 when screws 72 are tightened along the length of clamp bars 66. Screw levers 68 also pass through holes 75 in wedge bars 67, but holes 75 are large enough so they are not engaged by screw levers 68. Screw levers 69 pass through and engage smaller holes 76 in wedge bars 67 so as to draw wedge bars 67 radially outward, preferably to a fixed, outermost position when screws 72 are tightened. Screw levers 69 also pass through holes 77 in clamp bar 66 but holes 77 are large enough so that screw levers 69 do not engage clamp bar 66.

When drawn tight in slots 65, wedge bars 67 provide a fixed, abutment surface sturdily supporting the trailing end 78 of blocks 55, to give blocks 55 a solid support against the force of relatively moving material driven against blocks 55 by rotor 43 turning in the direction of the arrow. The leading ends 74 of blocks 55 are snugly held in place by clamp bars 66 which can be forced radially outward by screw levers 68 sufficiently far to clamp each row of blocks 55 firmly in place in shells 61. The result is then axial rows of blocks 55 clamped firmly in place in shells 61 with the heads of bars 66 and 67 forming generally smooth surfaces between each row of blocks 55.

The rows of blocks 55 are preferably staggered or offset relative to each other by means of spacers 79 positioned at alternately opposite ends of successive rows of blocks 55. Since all the blocks 55 have potted coatings 59 that are preferably formed in the same mold, coverings 59 form uniform bases so that all the blocks 55 can be accurately clamped in place by bars 66 and 67.

Rotor blocks 56 are also clamped in place in rotor 43. Axial grooves 80 are formed in rotor 43 to receive rows of blocks 56, and grooves 80 have a wedge-shape 81 for receiving and supporting trailing edges 82 of blocks 56. This gives a fixed and firm support to each row of blocks 56. At the leading edge 83 of blocks 56 an axial wedge bar 84 is wedged in place by screws 85 to clamp leading edges 83 snugly in place for each row of blocks 56. Wedge bars 84 are preferably wedge-shaped as illustrated for a tight, wedged fit augmenting the holding power of screws 85.

Relatively smooth and open surfaces 86 adjacent wedge bars 84 separate rows of blocks 56. Rows of blocks 56 are also preferably staggered or offset relative to each other by spacer blocks 87 arranged at alternate ends of each row of rotor blocks 56.

The improved clamping of blocks 55 and 56 in place in machine 40 simplified the machine and reduces the construction costs, and also improves on the security and convenience of the clamping so that blocks 55 and 56 can be readily replaced, interchanged, or moved. The epoxy coatings 59 and 60 give the blocks uniform and durable bases facilitating such a clamping arrangement. The operation of machine 40 will be described below.

Machine 90 is another preferred embodiment of the inventive mixer-refiner and is made larger than machine 40 and capable of greater power and mixing rate. It includes a cylindrical stator 91 supported on a base 92 and containing a cylindrical rotor 93 mounted on shaft 94 turned by a motor (not shown). Material is input through a chute 95 to a rotating sleeve 96 carrying a screw 97 for feeding material axially into disk refiner 98. Output is through an opening 99 in end plate 100, and through a discharge chute 101.

Stator 91 is formed of a pair of semi-cylindrical shells 102 having flanges 103 bolted together. Radial plates 104 extend around the outside of shells 102, and axial bars 105 extend through radial plates 104 for the length of stator 91. Rotor 92 is formed of radial plates 106 secured to shaft 94 and carrying axial bars 107.

Stator 91 has interchangeable blocks 110 arranged in axial rows inside shells 102, and rotor 93 has interchangeable blocks 111 arranged in axial rows on plates 107. Blocks 110 and 111 are preferably epoxy-potted to have respective coatings 112 and 113 as previously described and as shown in FIG. 16. Stator spacer blocks 114 are placed alternately at opposite ends of rows of stator blocks 110 to stagger or offset the rows, and rotor spacer blocks 115 are similarly used to offset rows of rotor blocks 111. Stator and rotor blocks 110 and 111 are shown in greater detail in FIGS. 17 – 24 and are described more fully below. The mounting of blocks 110 and 111 is best shown in FIG. 16.

Stator blocks 110 are preferably clamped to the inside of shells 102 in a similar manner to that described above for machine 40. Axial slots 116 are formed along the length of shells 102 and extend into radial plates 104 to receive and support wedge bars 117 and clamp bars 118 that extend axially the length of stator 91. Wedge bars 117 have notches 119 along their length to seat against plates 104, and clamp bars 118 have deeper notches 120 along their length to clear plates 104. This allows clamp bars 118 to move radially in slots 116, and allows wedge bars 117 to seat firmly in a radially outermost position resting against plates 104.

The heads of bars 117 and 118 are dovetailed as illustrated so that wedge bar 117 provides a fixed, angled recess receiving the trailing edges of a row of stator blocks 110, and clamp bar 118 is drawn tight against the leading edges of a row of stator blocks 110. The heads of bars 117 and 118 provide a generally smooth and open space between rows of stator blocks 110.

Bars 117 and 118 are held in place by screw levers 121 and 122 extending through holes in bars 117 and 118 and through holes 123 in axial bars 105. Each of the screw levers 121 and 122 has a fulcrum end 124 resting against the outside of shell 102, and can be levered away from shell 102 by a screw 125.

As best shown in FIG. 25, wedge bar 117 has a hole 126 that is enlarged at one end for loosely receiving screw lever 122 and narrowed at the other end for engaging screw lever 121. Then as the screw 125 in screw lever 121 is tightened, screw lever 121 is driven against the narrow edge of hole 126 to force the notch 119 of wedge bar 117 into firm engagement with plate 104. At the same time, screw lever 122 has some freedom movement in the other end of hole 126.

As best shown in FIG. 26, clamp bar 118 has a hole 127 that is enlarged at one end for loosely receiving screw lever 121 and is smaller at the other end for engaging screw lever 122. Then as screw 125 in screw lever 122 is turned against shell 102, screw lever 122 engages the narrow end of hole 127 and moves clamp bar 118 radially outward for drawing the head of bar 118 snugly against the leading edges of a row of stator blocks 110. The general result is the same as previously described, in that several rows of stator blocks 110 are firmly and conveniently secured in place inside shells 102 and are replaceable or interchangeable simply by loosening and removing bars 117 and 118.

Rotor blocks 111 are secured in place in axial rows on rotor 93 by means of wedge bars 129 and clamp bars 130. Wedge bars 129 extend axially of rotor 93 in a radial slot and have a projection 31 lodged in a notch 132 to fix wedge bars 129 radially in place. Then the dovetailed-shaped head of wedge bar 129 provides a fixed and rigid support for the trailing ends of a row of rotor blocks 111.

Clamp bars 130 also extend axially of rotor 93 and are adjacent wedge bars 129 in a radial slot in rotor 93. Clamp bars 130 have smaller projections 133 that are free to travel radially in notches 134. Another axial bar 135 is trapped in a notch 136 so that bar 135 cannot move radially outward from notch 136. Bar 135 has an axial succession of threaded holes for receiving bolts 137 extending through clamp bars 130 and screwed into bars 135 for drawing clamp bars 130 radially inward to draw their dovetailed heads tightly down against the leading edges of a row of rotor blocks 111. The heads of bars 129 and 130 provide a generally smooth and open area between rows of rotor blocks 111, and bars 129 and 130 provide a secure and convenient clamping arrangement for holding rotor blocks 111 firmly in place around rotor 93.

Figure 18:
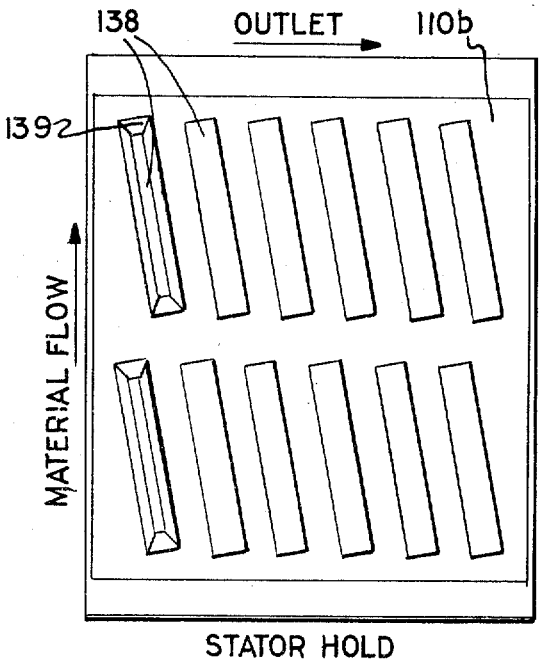
Figure 19:
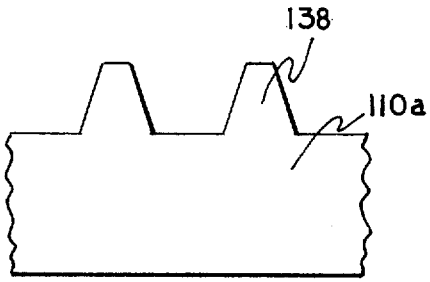
FIG. 19 is an enlarged, fragmentary, cross-sectional view of the working bars of the stator block of FIG. 17 taken along the line 19 — 19 thereof.
Figure 20:
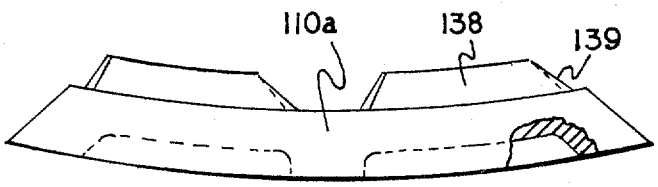
FIG. 20 is an end elevational view of the stator blocks of FIGS. 17 and 18.

The preferred details for stator blocks 110 for machine 90 are best shown in FIGS. 17 – 20. Stator block 110a of FIG. 17 has two rows of raised bars 138 oriented to feed material toward the outlet of the machine. Each of the bars 138 is generally trapezoidal with a flat top and tapered sides as best shown in FIG. 19, and the leading edges 139 of bars 138 are preferably angled back from the machine radius by about 60°. Also, bars 138 are preferably angled about 10° from the direction of relative motion between rotor 93 and stator 91.

The two rows of bars 38 on block 110a are offset so that the spaces between bars 138 are not aligned. This requires material passing through the foremost row of bars 138 to turn toward one side or the other to pass between the subsequent row of bars 138. The space between the two rows of bars is generally open and smooth to allow turbulence and mixing of material diverted and forced between the successive rows of bars 138.

Stator block 110B as shown in FIG. 18 is the same as block 110A except that its raised bars 138 have the opposite angle of orientation to hold back material or move material away from the outlet of the machine. The angle of inclination of bars 138 from the radial plane of the machine is also preferably about 10°.

It is also possible to use neutral stator blocks having bars aligned with the relative motion between stator 91 and rotor 93, and such neutral blocks were described previously relative to FIG. 8. Experience with the inventive machine has shown that at least for cellulose fiber material, combinations of feed blocks 110A and hold blocks 110B are preferred to neutral blocks.

Figure 23:
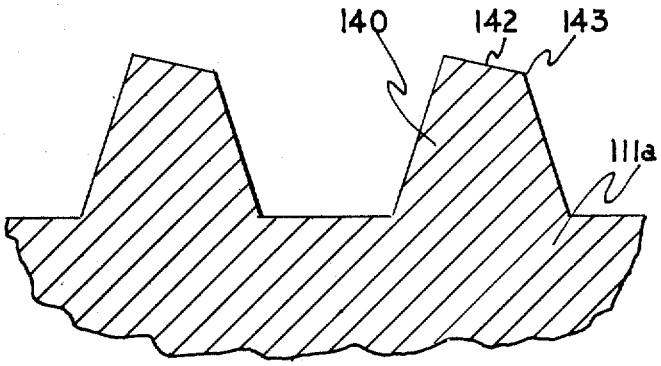
FIG. 23 is an enlarged fragmentary, cross-sectional view of the working bars of the rotor block of FIG. 21 taken along the line 23 — 23 thereof.

The preferred rotor blocks for machine 90 are best shown in FIG. 21 – 24, without the molded epoxy covering 113 that is preferably applied before the blocks are assembled into machine 90. Rotor block 111A of FIG. 21 has two rows of raised bars 140 oriented to feed material toward the outlet of machine 90. Bars 140 are preferably angled about 15° from the direction of relative motion between rotor 93 and stator 91, and their leading edges 141 are preferably angled back from the machine radius by about 60°. As best shown in FIG. 23, bars 140 are generally trapezoidal in shape with sloping sides, but the tops 142 of bars 140 are preferably sloped downward toward the leading or working edges 143 of bars 140 as illustrated. Because of the angle of bars 140, edges 143 are leading or obliquely working their way into the material in the machine, and tops 142 are sloped downward toward top edges 143. This gives bar tops 142 an outward camming action against the material which is engaged obliquely by edge 143 and moved radially outward as the material tends to slide over bar tops 142.

Rotor block 111B of FIG. 22 is the same as block 111A except that the raised bars 143 on block 111B have the opposite angular orientation for holding back material or moving material away from the machine outlet. Rotor neutral blocks such as shown in FIG. 5 can also be used in machine 90, but for most materials, combinations of feed blocks 111A and hold blocks 111B are preferred.

OPERATION

Experience with the invention since the parent patent application was filed has made its operation more clear and has shown that the invention has more uses than originally anticipated. For example, the inventive machine is an excellent mixer as well as a refiner, and can be used for mixing many highly viscous materials. The machine was originally built for refining thick suspensions of cellulose fibers, but many other highly viscous materials can be mixed, refined, or thoroughly contacted with a gas.

An example of material that can be mixed in the highly viscous stage in the inventive machine, but not in other equipment is ink which is a mixture of solid materials in a solvent. The only previously known way of mixing the solid ink materials in with the solvent was to mix at a fairly low viscosity. This then requires shipping considerable solvent weight along with the ink solids. In the inventive machine, ink solids can be mixed with a solvent at a high viscosity thoroughly enough so that the ink can be shipped in a highly concentrated form and diluted with more solvent at the printing site. This effects substantial economies.

Another accomplishment of the inventive mixer-refiner is to break down and mix impurities and spread them so thoroughly throughout cellulose fibers that they do not cause any problem in paper-making machines. For example, glue, asphalt, and plastic materials find their way into waste paper for recycling, and even small bits of these materials can stick to a paper-making machine and require shutdowns and clean-up. However, the inventive mixer-refiner breaks down adhesives and other troublesome materials into minute particles and mixes them so thoroughly with cellulose fibers that in effect they disappear and do not cause any problems.

It has been discovered in operating the inventive machine that proper arrangement of stator and rotor blocks accomplishes automatic mixing control. To achieved this, the stator is formed of a combination of hold and feed blocks with the feed blocks outnumbering the hold blocks so that the stator has a predominant feed orientation. The rotor is then arrayed with either an equal number of hold and feed blocks to have an overall neutral feed orientation, or with hold blocks slightly predominating so that the rotor tends to hold rather than feed.

Then as material is introduced to the machine, the rotor throws it centrifugally outward into the stator bars, and the stator bars gradually fill with material without much mixing or refining. When material builds up in the stator sufficiently to bridge the gap between the stator and rotor bars, it is worked on by the rotor bars as well. Rotor bars are formed to have a better frictional grip on the material so that before the rotor bars fill with material, they grip the material firmly enough to begin spinning it through the stator bars. The material is tumbled, turned, moved around corners, and over edges of the stator bars, and is engaged and pressed by edges of the rotor bars and subjected to considerable turbulence in the generally clear areas between bars. Since the stator bars are generally oriented to feed, the material begins to move toward the outlet as the rotor bars spin the material through the stator bars. Since the bars are discontinuous or separated by open space, there is no single, comfortable path from the inlet toward the outlet, and the material is constantly tumbled, pushed forward and backward, and moved over edges of the working bars as it proceeds along toward the outlet.

If the material input rate slows down for some reason, feeding also slows down because feeding occurs only when there is sufficient material between the rotor and the stator for the rotor to grip the material and spin it through the stator bars. This ensures that no material passes through the machine without being thoroughly mixed, because feeding occurs only at times of substantial mixing.

It is important that the rotor bars have a better frictional grip on the material than the stator bars to achieve the desired relationship between mixing and feeding. The better grip of the rotor bars can be achieved in several ways, and the preferred arrangement is to incline the rotor bars at a greater angle than the stator bars relative to the motion between the rotor and the stator. Hence, in the illustrated embodiments, the rotor bars are preferably angled 15° from the radial plane, and the stator bars angled only 10° from the radial plane. Other possibilities are to make the rotor bars more numerous and closer together, to give the rotor bars a greater total length of working edges, or to make the rotor bars taller than the stator bars. The general and desired effect of any of these arrangements is that the rotor grips the material more forcefully than the stator so that the rotor generally drives the materiaL which slides through the stator bars in response to the rotor force and is fed through the machine only when driven by the rotor through the stator bars.

Several variations in hold and feed patterns can be used. For example, rotor and stator blocks can be arranged for predominantly feeding material near the input region of the machine, and for predominantly holding back in zones away from the input. One preferred region for holding back material is near the outlet of the machine, and other holding back regions can be spaced along the axis of the machine. [For some materials it may be desirable to give the rotor a heavy predominance of hold blocks, and other] *Most* materials are better mixed with a rotor that has equal numbers of hold and feed blocks, *although a slight predominance of feed or hold bars can be used in the rotor*. Also, the predominance of the feed orientation of the stator can be modified with different materials. Blocks on both the rotor and stator are preferably alternated or mixed to avoid any solid ring of either feed or hold blocks. The open spaces between the bars on stator and rotor blocks are also important to allow space for turbulence of the material leaving one group of bars and entering another group of bars.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to adapt the invention to a wide variety of mixing and refining tasks and will know how to vary the working surfaces of the rotor and stator within the spirit of the invention to achieve optimum results.

I claim:

1. In a mixer-refiner having a generally cylindrical stator and a coaxial internal rotor with confronting surfaces of said rotor and said stator configured for mixing and refining high-viscosity material, the improvement comprising:

a. said confronting surfaces of said rotor and said stator each having discrete raised bars arranged and spaced to allow said material to move between said raised bars without plugging between said raised bars;

b. a plurality of said raised bars on said rotor and said stator [ being ] *having leading working surfaces* inclined relative to [ the motion between said rotor and stator ] *a plane perpendicular to the axis of said mixer-refiner*, some of said [ inclined bars ] *working surfaces* being oriented to feed said material and some of said [ inclined bars ] *working surfaces* being oriented to retard said material;

c. said [ inclined ] bars on said stator having a net [feed] orientation *of said working surfaces* [relative] to *feed* said material;

d. said [ inclined bars on ] *working surfaces of* said rotor *bars* having a net orientation *that is approximately neutral* relative to feed of said material [ ranging from neutral to a feed orientation substantially less than said feed orientation of said inclined bars on said stator ], and e. said [ raised bars on ] *working surfaces of* said rotor *bars* being configured [ so that before any localized volume between said rotor and said stator completely fills with said material, said rotor bars engage ] *for engaging* said material with sufficient force [ to move ] *for moving* said material through said stator bars *before any localized volume between said rotor and said stator becomes filled with said material in response to input of said material.*

2. The mixer-refiner of claim 1 wherein *at least portions of* said [ raised bars have sloping leading edges ] *working surfaces are sloped.*

3. The mixer-refiner of claim 1 wherein [ the ] *said* angle of inclination of said [ inclined bars relative to the motion between said rotor and said stator ] *working surfaces* is approximately 10° – 15°.

4. The mixer-refiner of claim 3 wherein said inclination of said [ inclined bars ] *working surfaces* on said stator is approximately 10°, and said inclination of said [ inclined bars ] *working surfaces* on said rotor is approximately 15°.

5. The mixer-refiner of claim 1 wherein the tops of said [ inclined ] rotor bars are inclined downward toward [ the leading edges of said inclined rotor bars ] *said working surfaces.*

6. The mixer-refiner of claim 1 wherein said raised bars on said rotor and said stator each lie in a [ plane ] *cylindrical locus.*

7. The mixer-refiner of claim 1 wherein said [ inclined bars ] *working surfaces* on said rotor are inclined more than said [ inclined bars ] *working surfaces* on said stator.

8. The mixer-refiner of claim 1 wherein said raised bars on said rotor are raised to a greater height than said raised bars on said stator.

9. The mixer-refiner of claim 1 wherein said raised bars on said rotor are shorter than said raised bars on said stator.

10. The mixer-refiner of claim 1 wherein said raised bars on said rotor and said stator have sloping side edges.

11. The mixer-refiner of claim 1 wherein said raised bars on said rotor and said stator are arranged in groups that are spaced apart.

12. The mixer-refiner of claim 11 wherein [ said raised bars have sloping leading edges ] *at least portions of said working surfaces are sloped.*

13. The mixer-refiner of claim 12 wherein *the tops of* said raised bars on said rotor and said stator each lie in a [ plane ] *cylindrical locus.*

14. The mixer-refiner of claim 13 wherein said [ inclined bars ] *working surfaces* on said rotor are inclined more than said inclined bars on said stator.

15. The mixer-refiner of claim 14 wherein said raised bars on said rotor are raised to a greater height than said raised bars on said stator.

16. The mixer-refiner of claim 15 wherein the tops of said [ inclined ] rotor bars are inclined downward toward [ the leading edges of said inclined rotor bars] *said working surfaces.*

17. The mixer-refiner of claim 13 wherein said raised bars on said rotor are shorter than said raised bars on said stator.

18. The mixer-refiner of claim 14 wherein said raised bars on said rotor and said stator have sloping side edges.

19. The mixer-refiner of claim 11 wherein said spaces between said bar groups are generally clear and smooth to allow free movement of said material in said spaces.

20. The mixer-refiner of claim 11 wherein said raised bars in any one of said bar groups are parallel.

21. The mixer-refiner of claim 11 wherein [ the ] *said* inclination of said [ bars ] *working surfaces* of said rotor changes for rotationally successive ones of said rotor bar groups.

22. The mixer-refiner of claim 11 wherein said groups of said raised bars are formed respectively on a plurality of removable blocks.

23. The mixer-refiner of claim 22 including clamp bars for holding said removable blocks in place.

24. The mixer-refiner of claim 23 wherein said blocks are arranged in axial rows.

25. The mixer-refiner of claim 24 including spacers arranged in said rows to stagger said rows of blocks from each other.

26. The mixer-refiner of claim 25 including means for fixing one of said clamp bars in place at the trailing edge of each of said rows of blocks and means for adjustably tightening another one of said clamp bars on the leading edge of each of said rows of blocks.

27. The mixer-refiner of claim 23 wherein said rotor and said stator have longitudinal slots for receiving said clamp bars, and including screw means for tightening said clamp bars in said slots.

28. The mixer-refiner of claim 23 wherein said clamp bars provide generally smooth surfaces between said groups of said raised bars.

29. The mixer-refiner of claim 11 wherein said rotor has an equal number of said bar groups inclined to retard said material and to feed said material.

30. The mixer-refiner of claim 11 including groups of said bars generally aligned with the direction of relative motion between said rotor and said stator.

31. The mixer-refiner of claim 11 wherein an input region of said mixer-refiner includes more of said [ bar groups ] *working surfaces* oriented to feed said material than to retard said material.

32. The mixer-refiner of claim 11 wherein an output region of said mixer-refiner has more of said [ bar groups ] *working surfaces* oriented to retard said material than to feed said material.

*33. The mixer-refiner of claim 1 wherein said working surfaces of said rotor bars have a net orientation for a slight feed of said material substantially less than said feed orientation of said stator working surfaces.*

*34. The mixer-refiner of claim 1 wherein said rotor working surfaces inclined to feed said material equal said rotor working surfaces inclined to retard said material.*

*35. The mixer-refiner of claim 1 wherein said working surfaces of said rotor bars have a net orientation for a slight hold of said material.*

* * * * *